Dec. 10, 1935.  E. EMERY  2,023,726
SAW BLADE
Filed July 30, 1934
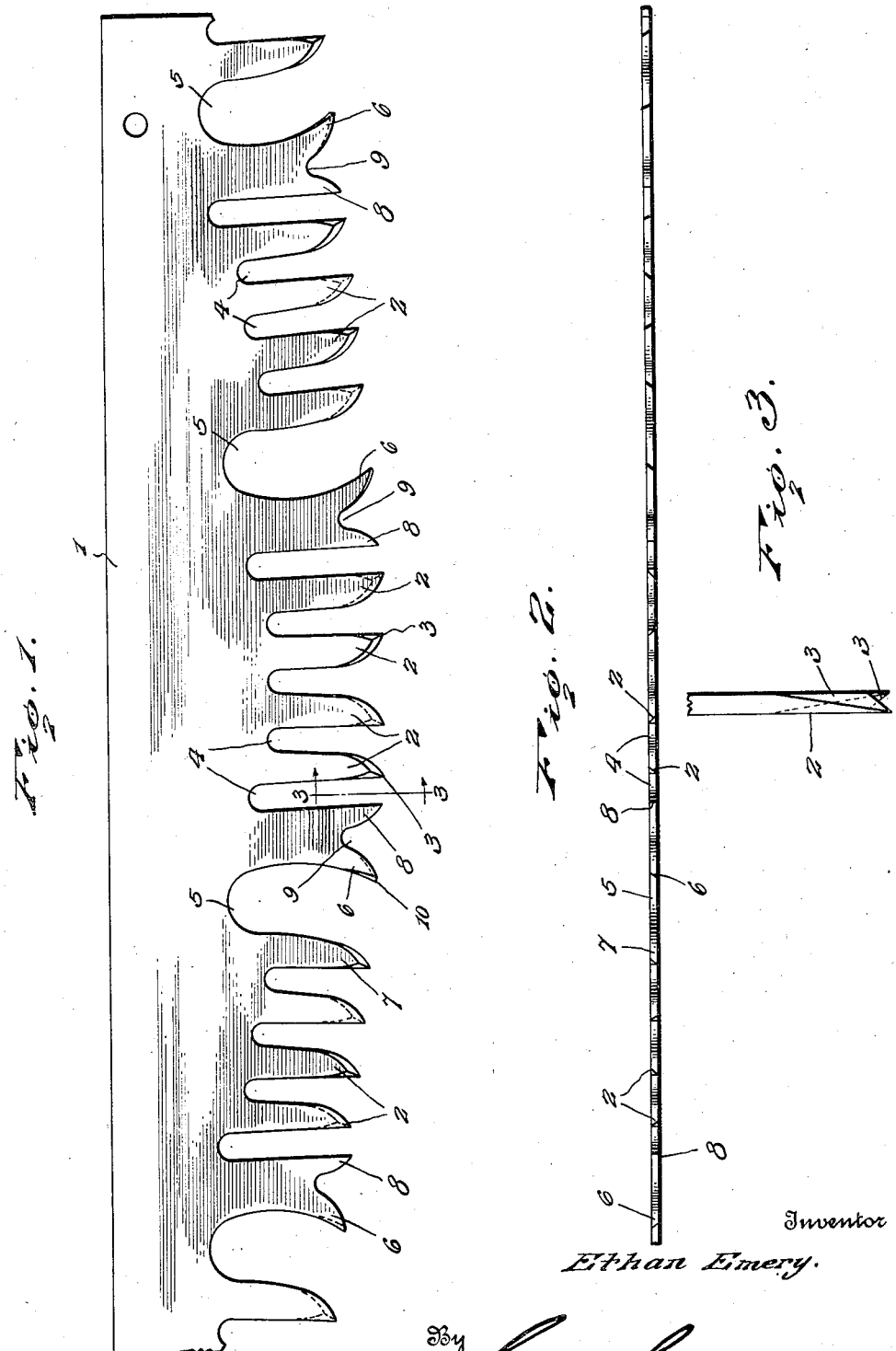
Inventor
Ethan Emery.
By Lacey & Lacey, Attorneys Patented Dec. 10, 1935

2,023,726

UNITED STATES PATENT OFFICE 2,023,726

SAW BLADE

Ethan Emery, Republican City, Nebr.

Application July 30, 1934, Serial No. 737,641

1 Claim. (Cl. 143—133)

This invention relates to saws and is especially designed for cross cut saws, although the teeth employed may be utilized in circular saws and other forms of saws. The object of the present invention is to improve the construction of the saw blade so that when the saw is in use a clean cut will be made and dust and shavings will not accumulate in the kerf. The invention is illustrated in the accompanying drawing and consists in certain novel features which will be fully described and particularly defined.

In the drawing:

Figure 1 is a side elevation of a saw constructed in accordance with the present invention.

Figure 2 is a plan view of the working edge of the blade.

Figure 3 is an enlarged detail section on the line 3—3 of Figure 1.

The blade 1 is constructed of steel, as is usual, and may be of any desired length. At the center of the blade in its working edge is a group of cutting teeth 2, the advancing edges of which are substantially perpendicular to the back edge of the blade, while the trailing edges are curved or made to converge toward the advancing or leading edges, as shown. These teeth are beveled alternately on opposite sides to produce the cutting points 3 and it will be observed that the teeth nearest the center of the blade have their adjacent opposed edges curved at their ends toward the opposite edges of the respective teeth and this arrangement causes some of the teeth to act when the blade is moved in one direction, and the other teeth to act when the blade is moved in the opposite direction. It will also be noted that the bevels are disposed on opposite sides of alternate teeth so that one tooth will cut down one side wall of the kerf and the adjacent tooth will cut down the opposite side wall of the kerf. The teeth are separated by deep recesses 4 extending toward the back edge of the blade, which spaces provide clearance for shavings and dust which might otherwise accumulate and clog the action of the saw. Adjacent the end teeth of the group of teeth is a dust pocket 5 in which the shavings and sawdust may collect and be carried to the end of the kerf where they will be discharged. This dust pocket is defined by a raker tooth 6 on one side and a cutting tooth 7 on the opposite side, the cutting tooth 7 being an end tooth of a second group of teeth, as will be understood upon reference to the drawing. Trailing the raker tooth 6 is a gage tooth 8, one edge of which is straight and parallel to the opposed edge of the adjacent cutting tooth, while the opposite edge is curved toward the raker tooth, a shallow pocket 9 being formed between the gage tooth and the adjacent raker tooth by the curved edges of said teeth. The advancing edge of the raker tooth 6 is beveled, as shown at 10, so that, as the saw is drawn through the kerf, the point of the raker tooth will plane out the center of the kerf and will direct the shavings and dust up into the dust pocket 5. This arrangement of the teeth is repeated throughout the length of the blade, the teeth at one side of the center of the blade cutting through the kerf as the blade is moved in one direction and the teeth at the opposite side of the center of the blade cutting through the kerf as the blade is moved in the opposite direction.

As the blade is alternately pushed and pulled through the log or other material, the teeth, which have their cutting points on what are then their advancing edges, will penetrate the wood and cut away the same so as to form a kerf and deepen the same on successive strokes. Upon the reverse stroke of the blade the formerly active teeth will become inactive and formerly inactive teeth will become active. As stated, the raker teeth on their active stroke will plane the center of the kerf and will deepen the same and the shavings and dust will be held in the dust pocket until the end of the kerf has been reached and cleared, whereupon the accumulation will be discharged. Should, however, any of the shavings or sawdust fail to discharge and, consequently, be retained in the kerf, such waste will be engaged by the corresponding gage tooth 8 on the reverse stroke and will be pushed to the opposite end of the kerf instead of remaining on the bottom thereof and causing the saw to tride over the same. Uniformity of cut is thus attained. The beveling of the edges of the teeth at the points thereof produce sharp cutting edges so that the teeth will have a plane action and will readily cut through and remove portions of the surface presented to them. The blade in actual use has been found to operate very easily and with a very high degree of efficiency.

Having thus described the invention, what is claimed as new is:

A saw blade having groups of cutting teeth along its working edge through its length, and gage teeth and raker teeth at the ends of each group of cutting teeth, the gage teeth being disposed between the raker teeth and the cutting teeth, the raker teeth being separated from the cutting teeth of an adjacent group by deep dust pockets and the advancing edge of each raker tooth having its free end portion beveled transversely to form a diagonally extending planing edge, the cutting teeth in each group of teeth being beveled alternately on opposite sides whereby the alternate teeth will plane the opposite walls of a kerf.

ETHAN EMERY. [L. S.]